United States Patent
Reimann

(10) Patent No.: US 8,720,847 B2
(45) Date of Patent: May 13, 2014

(54) EXTERNAL ARTICULATION MECHANISM WITH A NOISE-DAMPENING SUPPORT ELEMENT

(75) Inventor: Ingo Reimann, Heiligenhaus (DE)

(73) Assignee: Ferd. von Hagen Sohne & Koch GmbH & Co. KG, Wuppertal (DE)

( * ) Notice: Subject to any disclaimer, the term of this patent is extended or adjusted under 35 U.S.C. 154(b) by 252 days.

(21) Appl. No.: 13/275,088

(22) Filed: Oct. 17, 2011

(65) Prior Publication Data

US 2012/0319425 A1 Dec. 20, 2012

(30) Foreign Application Priority Data

Nov. 17, 2010 (DE) .......................... 10 2010 051 451

(51) Int. Cl.
*B60N 2/015* (2006.01)
(52) U.S. Cl.
CPC ...................................... *B60N 2/015* (2013.01)
USPC ...................... 248/503.1; 296/65.03; 297/336
(58) Field of Classification Search
USPC ..................... 248/503.1, 397, 220.21, 221.11, 248/222.13, 225.11, 288.11, 291.1, 292.13; 16/324–326; 403/111, 149; 296/65.09, 296/65.16–65.17, 65.03; 292/341.12–341.13, DIG. 56, DIG. 73, 292/95–96, 121–122, 128, 101–103, 108, 292/194–195, 219–220, 228, 202–204, 292/210; 297/361.1, 354.12, 374, 336
See application file for complete search history.

(56) References Cited

U.S. PATENT DOCUMENTS

| 5,685,612 | A | * | 11/1997 | MacDonald et al. | ...... 297/378.1 |
| 7,083,215 | B2 | * | 8/2006 | Rhee et al. | ................. 296/65.16 |
| 7,581,793 | B2 | * | 9/2009 | Hartmann et al. | ......... 297/463.1 |
| 2002/0093234 | A1 | * | 7/2002 | Thorn et al. | .................. 297/374 |
| 2010/0244528 | A1 | * | 9/2010 | Naughton | ................ 297/354.12 |

FOREIGN PATENT DOCUMENTS

| DE | 19601367 A1 | * | 7/1996 | |
| EP | 1277611 A1 | * | 1/2003 | ............... B60N 2/36 |

* cited by examiner

*Primary Examiner* — Terrell McKinnon
*Assistant Examiner* — Ingrid M Weinhold
(74) *Attorney, Agent, or Firm* — Jennifer S. Stachniak; Robert W. Becker

(57) ABSTRACT

An external articulation mechanism for pivotably holding the backrest of a vehicle seat on the vehicle. A receiving element can be secured to the vehicle and has a support opening and side walls defining an introduction slot that opens into an open side of the support opening. A pivot member securable to the backrest can be inserted into the support opening via the introduction slot. An arresting mechanism on the receiving element extends over the open side of the support opening and is pivotable between release and arresting positions. A support element disposed on the pivot member has an extension that juts into the introduction slot and that on both sides has deformable projections for resiliently engaging recesses of the side walls of the receiving element.

7 Claims, 2 Drawing Sheets

EXTERNAL ARTICULATION MECHANISM WITH A NOISE-DAMPENING SUPPORT ELEMENT

The instant application should be granted the priority date of Nov. 17, 2010, the filing date of the corresponding German patent application 10 2010 051 451.9.

BACKGROUND OF THE INVENTION

The present invention relates to an external articulation mechanism for the pivotable holding of the backrest of a vehicle seat on a part that is secured to the vehicle, wherein a pivot member is secured to the backrest to allow pivoting thereof, with the pivot member being insertable into a receiving element that is to be secured to the vehicle and has a support opening that is open on one side, wherein the pivot member can be arrested in position in the receiving element by means of an arresting mechanism that extends over the open side of the support opening and is pivotable between a release position and an arresting position, with an introduction slot for the pivot member being formed in the receiving element and leading into the support opening.

An external articulation mechanism having similar features is described in DE 101 33 707 B4. The pivot member is embodied as a bolt that is mounted on the backrest structure, and that during the assembly of the backrest, i.e. the vehicle seat, is pressed into the introduction slot of the receiving element. For arresting the bolt in the receiving element, disposed on the receiving element is a rotatable blocking mechanism having a hook that extends over the bolt that is disposed in the support opening of the receiving element. The blocking mechanism has formed thereon an extension and, when the bolt is introduced into the introduction slot that leads into the support opening, the blocking mechanism, by pressing upon its extension, automatically pivots into a blocking position. This enables a sort of locking mounting of the backrest on the receiving element.

Since when the bolt or pivot element is disposed in the support opening of the receiving element it is not possible to prevent a certain amount of play between the pivot element and the receiving element, the known design of the external articulation mechanism has the drawback that an undesired generation of noise occurs due to vibrations during operation of the motor vehicle.

DE 196 01 367 A1 furthermore discloses a support for a backrest of a vehicle seat that is pivotably disposed on the support, whereby a pin that is disposed laterally of the backseat is held in an upwardly open support opening of the support by means of an elastically deformable anchoring element that is disposed on the pin.

It is therefore an object of the present invention to largely avoid the occurrence of support noises with an external articulation mechanism of the aforementioned general type having a backrest mounted thereon.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
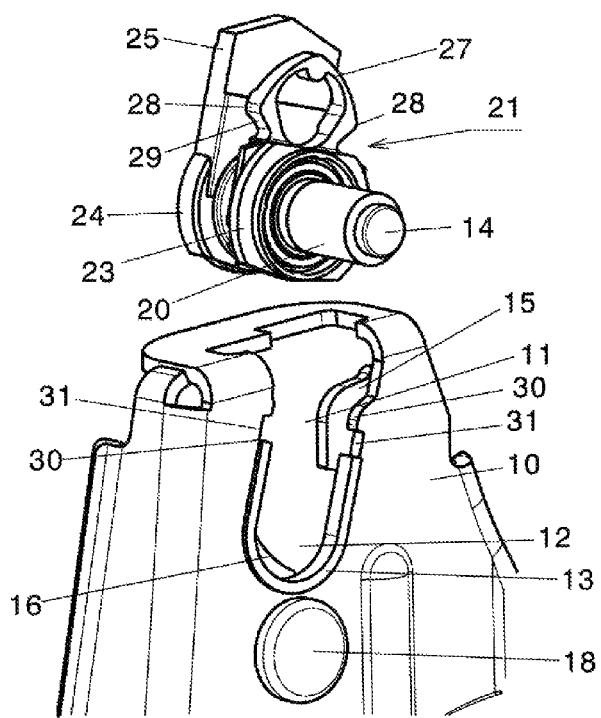
FIG. 1 is a perspective view from the side of a backrest of a partially illustrated receiving element of an external articulation mechanism having the support element preassembled on a pivot member, prior to the assembly of the pivot member in the receiving element.

The basic concept of the present invention is that a support element is disposed on the pivot member of the backrest, with the support element being provided with an extension that projects in the direction of the introduction slot and, when the pivot member is inserted into the support opening, is disposed in the introduction slot, wherein elastically deformable projections are formed on both sides of the extension and protrude in the direction of the side walls of the receiving element that define the introduction slot, wherein when the pivot member is inserted into the support opening, the projections resiliently engage into recesses formed in the side walls.

The present invention primarily has the advantage that, by the support element that is disposed on the pivot member, via the resilient engagement of the support element against the side walls of the receiving element that define the introduction opening or slot, a springy or elastic preload is exerted upon the pivot member that is disposed in the support opening, accompanied by a corresponding compensation of tolerance, so that rattling or chattering noises caused by play are avoided. A further advantage is that during the assembly or mounting of the pivot member in the receiving element, the support element, with the extension formed thereon, ensures an automatic adjustment of the pivot member relative to the receiving element, so that due to the support element seated on the pivot member, a simplification and improvement of the mounting and assembly also results.

Pursuant to one specific embodiment of the present invention, with regard to the configuration of the support element, the extension formed on the support element has the shape of an open rhombus that extends through the introduction slot, with the outer corner points of the rhombus, which jut out on both or opposite sides, forming the projections that catch or engage into the recesses of the side walls of the receiving element. This provides the advantage that when the pivot member, with the support element, is inserted into the introduction slot of the receiving element, the outer corner points of the rhombus-shaped extension of the support element deflect inwardly, so that the rhombus-shaped extension is adapted to the longitudinal extension of the introduction slot until the outer corner points have reached the recesses formed in the side walls of the receiving element and snap outwardly in a resilient manner into the recesses. At the same time, due to the rhombus shape, corresponding inclined surfaces automatically result at the outer contour of the support element, with these inclined surfaces facilitating the insertion of the support element into the introduction slot as well as a compression of the corner points. Thus, a centering and automatic adjustment of the support element and of the pivot member during the insertion into the receiving element is also automatically provided.

Pursuant to one embodiment of the invention, the support element comprises a sleeve that carries the extension and that can be pressed upon the pivot member of the backrest. To improve the assembly of the external articulation mechanism, the support element with the pivot member can be retained in an arresting manner via respectively formed arresting or detention structures.

To improve the guidance of the support element during its mounting on the receiving element, pursuant to an embodiment of the invention the support element, on both of its frontal ends, can be provided with respective radially projecting rings, whereby when the pivot member is inserted into the support opening, the rings accommodate the wall of the receiving element, and the arresting mechanism that is pivotably mounted thereon, between them in a centering manner.

The support element can be configured in such a way that that ring that is directly adjacent to the arresting mechanism merges into a plate that extends parallel to the extension of the support element, with the extension being offset relative to the oppositely disposed ring such that when the external articulation mechanism is assembled, the extension is disposed within the introduction slot of the receiving element.

Pursuant to one embodiment of the invention, the support element is configured as a monolithically formed part made of polymeric material.

Pursuant to a preferred embodiment of the invention, the pivot member is embodied as a bolt that can be threaded into the backrest structure, wherein the support element can be pressed onto the bolt shaft of the bolt. In this connection, in an advantageous manner the bolt head of the bolt that forms the pivot member is snugly accommodated by that frontal ring of the support element that faces it and that carries the plate, thus resulting in a compact securement without sharply projecting edges.

Further specific features of the invention will be described in detail subsequently.

DESCRIPTION OF SPECIFIC EMBODIMENTS

Figure 2:
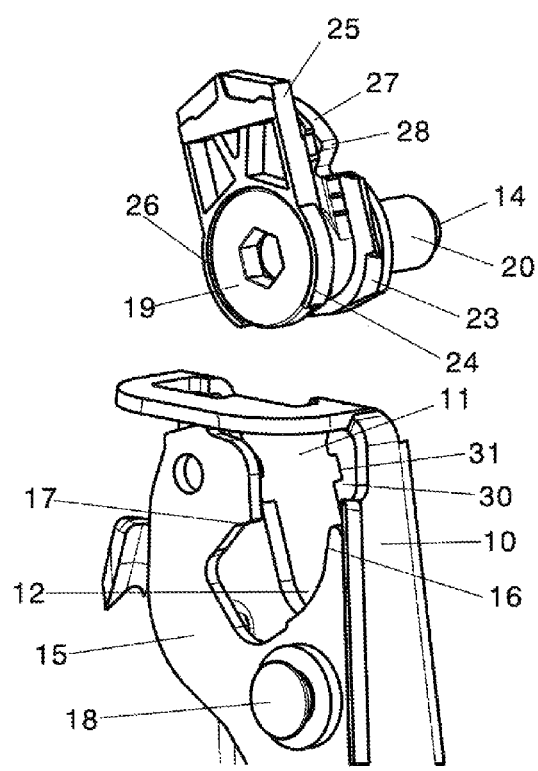
FIG. 2 is a view onto the outer side of the external mechanism of FIG. 1.
Figures 3, 4:
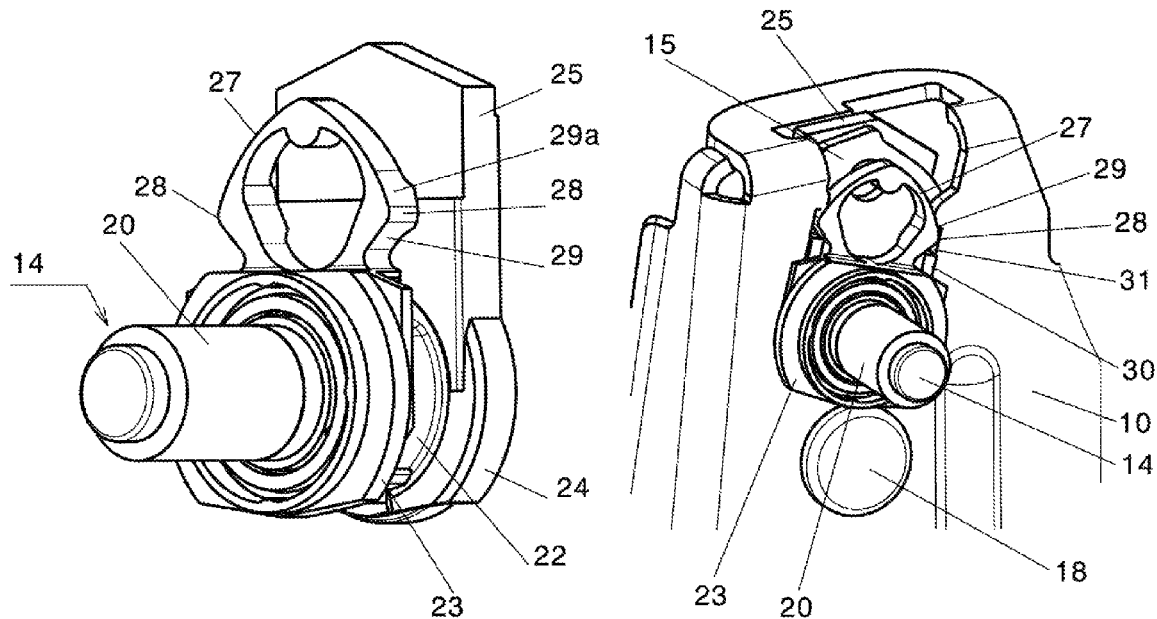
FIG. 3: is a perspective detailed illustration of the support element mounted on a pivot axis.
FIG. 4: in an illustration corresponding to that of FIG. 1, is a view of the pivot member, with support element, assembled in the receiving element.

Referring now to the drawings in detail, FIGS. 1 and 2 partially illustrate a receiving element 10 showing its support leg, which serves for the fixation and support of the non-illustrated backrest. Formed in the receiving element 10 is an introduction slot 11, which is open toward the outer end of the receiving element 10 and that itself ends in a support opening 12 for receiving a pivot member 14. The closed region of the support opening 12 is lined with a bearing or support segment 13. As can be seen in greater detail in FIG. 2, the pivot member 14 can be fixed in position in the support opening 12 by means of an arresting mechanism 15, which is pivotable about a pivot pin 18 that is provided on the receiving element 10. In the open position shown in FIG. 2, an extension 16 of the arresting mechanism 15 extends into the support opening 12. As a consequence, when the pivot member 14 is pressed into the introduction slot 11 with its adjoining support opening 12, the pivot member 14 presses upon the extension 16 of the arresting mechanism 15 and pivots the arresting mechanism to such an extent that the hook 17, which is formed on the arresting mechanism 15, extends over the pivot member 14, which is disposed in the support opening 12.

In the illustrated embodiment, the pivot member 14 is in the form of a bolt having a bolt head 19 and a bolt shaft 20. By means of a thread on the bolt shaft 20, the pivot member 14 can be screwed or threaded into the structure of a non-illustrated backrest before the backrest is mounted in the receiving element 10.

A support element 21 having a sleeve 22 formed thereon is pressed onto the bolt shaft 20 of the pivot member 14, which is embodied as a bolt. In a non-illustrated manner, arresting or detention structures, which are associated with one another and are in the form of projections/grooves, can be provided on the inner wall of the sleeve 22 and on the bolt shaft 20 in order to enable a non-detachable support of the support element 21 on the bolt shaft 20 for the purpose of a preassembly. Disposed at the respectively outer, frontal ends of the sleeve 22 that is on the support element 21 are an inner ring 23 and an outer ring 24, which serve for the centering and axial fixation of the support element 21, with pivot member 14 fixed thereon, in the introduction slot 11 and the support opening 12. For this purpose, when the pivot member 14 is placed into the support opening 12 the end rings 23 and 24 accommodate the wall of the receiving element 10, and the arresting mechanism 15 that is pivotably mounted thereon, between themselves. At the same time, during the insertion of the pivot member 14 with its support element 21 into the introduction slot 11, the end rings 23 and 24 ensure an appropriate centering relative to the receiving element 10. To improve this centering, proceeding from the outwardly disposed ring 24 is a plate 25 that juts up and extends in the longitudinal direction of the introduction slot 11. Formed on the outer side of the support element 21, in its outer ring 24 or plate 25, is a recessed area 26 for receiving the bolt head 19 when the support element 21 is pressed onto the pivot member 14, thus resulting in a snug accommodation of the pivot member 14 in the support member 21.

The support element 21 is furthermore provided with an extension 27 that extends parallel to, and spaced from, the plate 25 in the longitudinal direction of the introduction slot 11. The extension 27 has the shape of an open rhombus, the outer corner points of which form projections 28 which on both sides jut out relative to the side walls 30 of the receiving element 10 that define the introduction slot 11. Associated with the projections 28, in the side walls 30 of the receiving element 10, are recesses 31 into which, when the pivot member 14 is disposed in the support opening 12, the projections 28 of the support element 21 engage in a resilient manner. By means of the projections 28, which are embodied in a resilient or springy manner, a pre-loading is established between the receiving element 10 and the pivot member 14, via which the pivot member 14 is pressed into the deepest region of the support opening 12 of the receiving element 10, so that as a consequence of the established preloading, rattling or chattering noise caused by vibration is avoided. Due to the rhombus shape of the extension 27, inclined surfaces 29 that adjoin the projections 28 result; during the introduction of the pivot member 14, with the support element 21, into the introduction slot 11, the inclined surfaces 29 on the one hand facilitate the compression of the rhombus-shaped extension 27, thereby at the same time also effecting a guidance and centering of the support element 21 in the introduction slot 11, so that due to the arrangement of the support element 21 on the pivot member 14, the mounting of the pivot member 14 on the receiving element 10 is improved. On the other hand, the inclined surfaces 29a disposed above the projections 28 provide for a support of the extension 27 against the edges of the recesses 31 in the receiving element 10, so that when a loading occurs from the direction of the support opening 12, the projections 28 are pressed outwardly.

The specification incorporates by reference the disclosure of German priority document 10 2010 051 451.9 filed Nov. 17, 2010.

The present invention is, of course, in no way restricted to the specific disclosure of the specification and drawings, but also encompasses any modifications within the scope of the appended claims.

What I claim is:

1. An external articulation mechanism for a pivotable holding of a backrest of a vehicle seat on a part that is secured to a vehicle, comprising:

a receiving element (10) configured to be secured to a vehicle, wherein said receiving element (10) as a support opening (12) that is open on one side, and wherein said receiving element (10) has side walls (30) that define an introduction slot (11) that opens into the open side of said support opening (12);

a pivot member (14) configured to be secured to a backrest of a vehicle seat to allow pivoting of the backrest, wherein said pivot member (14) is configured to be inserted into said support opening (12) of said receiving element (10) via said introduction slot (11) of said receiving element;

an arresting mechanism (15) disposed on said receiving element (10) for arresting said pivot member (14) in position in said support opening (12) of said receiving element (10), wherein said arresting mechanism (15) is configured to extend over the open side of said support opening (12) and is pivotable between a release position and an arresting position; and a support element (21) disposed on said pivot member (14), wherein said support element (21) is provided with an extension (27) that, when said pivot member (14) is inserted into said support opening (12) of said receiving element (10) juts into said introduction slot (11) of said receiving element, further wherein elastically deformable projections (28) are formed on opposite sides of said extension (27) of said support element (21) and protrude toward said sidewalls (30) of said receiving element (10) that define said introduction slot (11), and wherein said pivot member (14) is inserted into said support opening (12) of said receiving element (10) said projections (28) resiliently engage into recesses (31) of said side walls (30), wherein said extension (27) of said support element (21) has the shape of a rhombus, and wherein outer corner points that jut out on opposite sides of said rhombus form said projections (28) that are adapted to engage into said recesses (31) of said side walls (30) of said receiving element.

2. An external articulation mechanism according to claim 1, wherein said support element (21) is comprised of a sleeve (22) that carries said extension (27) and that is adapted to be pressed onto said pivot member (14).

3. An external articulation mechanism according to claim 1, wherein said support element (21) is provided with two frontal ends, on each of which is provided a radially projecting ring (23, 24), and wherein when said pivot member (14) is inserted into said support opening (12) of said receiving element (10) said rings (23, 24) accommodate between them, in a centering manner, a wall of said receiving element (10) and a said arresting mechanism (15) that is pivotably disposed on said receiving element.

4. An external articulation mechanism according to claim 3, wherein one of said rings (24) that is disposed directly adjacent to said arresting mechanism (15) merges into a plate (25) that extends parallel to said extension (27) of said support element (21), and wherein said extension (27) is offset relative to the other one of said rings (23) in such a way that when said external articulation mechanism is assembled, said extension (27) is disposed within said introduction slot (11) of said receiving element (10).

5. An external articulation mechanism according to claim 1, wherein said support element (21) is configured as a monolithic part made of polymeric material.

6. An external articulation mechanism according to claim 4, wherein said pivot member (14) is configured as a bolt that is threadable into a structure of a backrest and that has a bolt shaft (20) onto which said support element (21) is adapted to be pressed.

7. An external articulation mechanism according to claim 6, wherein said bolt that forms said pivot member (14) has a bolt head (19) that is adapted to be snuggly accommodated by a frontal ring (24) of said support element (21) that faces said bolt head (19) and that carries said plate (25).

* * * * *